March 5, 1935.  A. W. ENGEL  1,993,505
TRANSPARENT FILING DEVICE
Filed Sept. 29, 1933  2 Sheets-Sheet 1
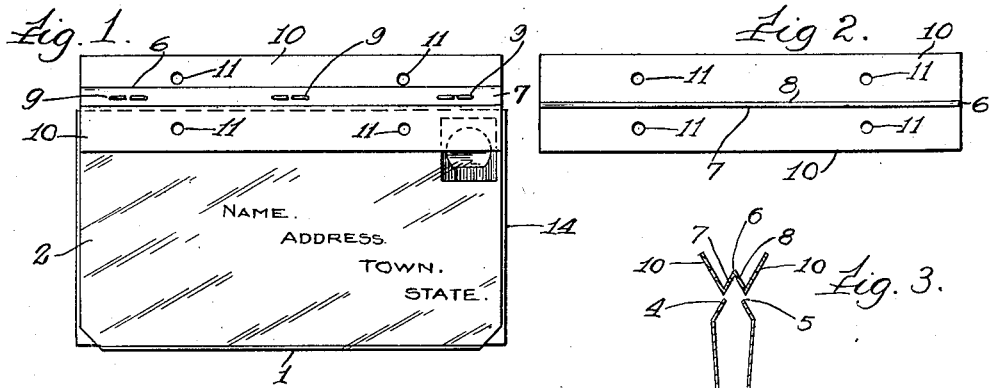
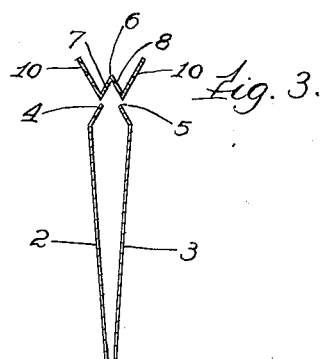
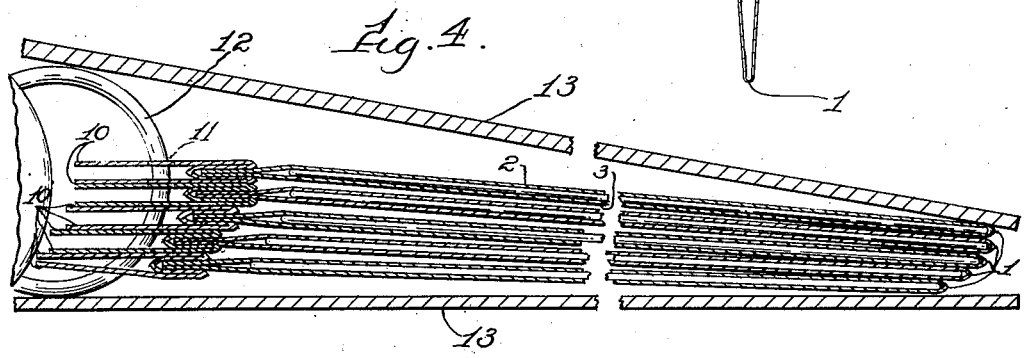
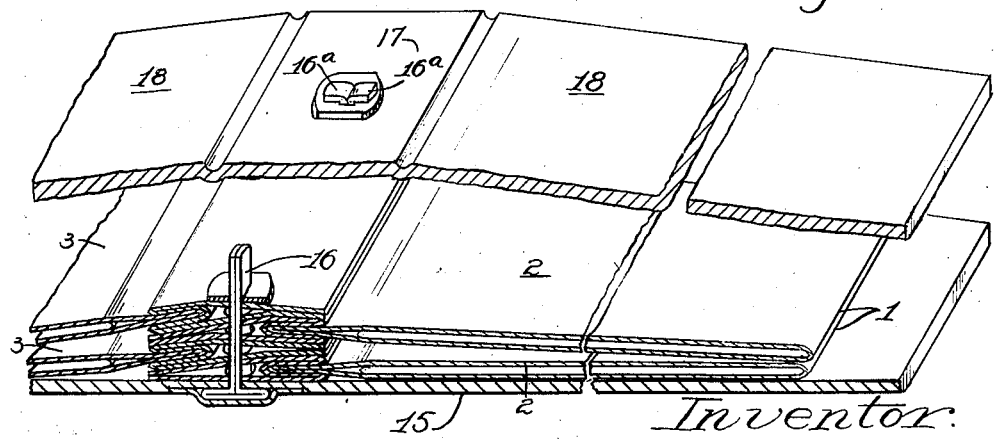
Inventor:
Albert W. Engel.
by Burton & Burton
his Attorneys.
Witness.
H. F. McKnight.

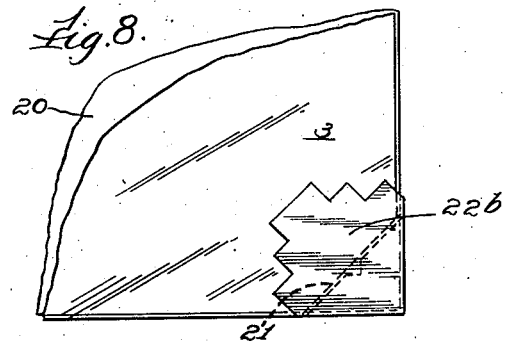
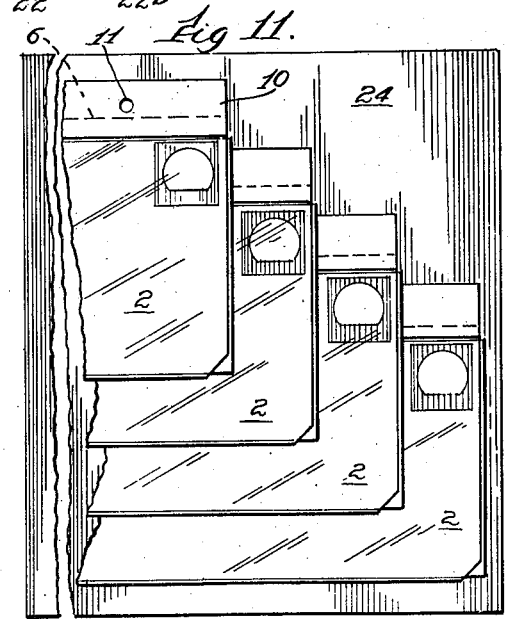
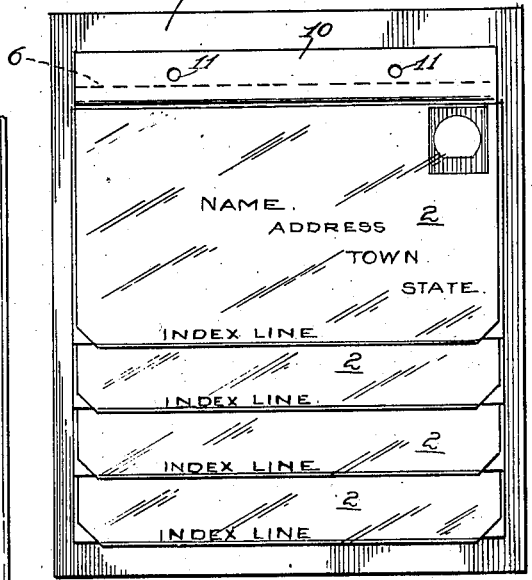

Patented Mar. 5, 1935

1,993,505

UNITED STATES PATENT OFFICE 1,993,505

TRANSPARENT FILING DEVICE

Albert W. Engel, Chicago, Ill.

Application September 29, 1933, Serial No. 691,424

10 Claims. (Cl. 129—20)

This invention relates to means for filing or displaying flat material, such as cards, pictures, folders, booklets and the like, and its object is to provide a holder for such material with one or more transparent walls through which it may be readily viewed, and with supporting means by which such holder may be secured in a binder, or attached to a display surface in various ways. The invention consists in certain elements in combination, and in certain features thereof as herein described and shown in the drawings, and as indicated by the claims.

In the drawings:

Figure 1 is a front elevation of a transparent unit holder embodying this invention.

Figure 2 is a plan view of the supporting hinge or hanger for the same.

Figure 3 is a transverse section showing the transparent folder element of the holder and the supporting member in position ready for assembly.

Figure 4 is a sectional view showing a number of unit holders assembled in a ring binder.

Figure 5 is a fragmentary sectional view showing a modified arrangement of the transparent holders in a special type of binder.

Figure 6 is an elevation showing several of the unit holders assembled in a book form by adhesive attachment to each other.

Figure 7 is a fragmentary view of a corner of a transparent holder showing a special device for retaining the material therein.

Figure 8 is a view of the reverse side of the parts shown in Figure 7.

Figure 9 is a detail section taken as indicated at line 9—9 on Figure 7.

Figure 10 is a face view showing several transparent holders mounted in overlapping relation on a supporting surface.

Figure 11 shows a modified arrangement of overlapping holders on a flat support.

The filing device which is the subject of this invention is adapted to a wide range of uses. It may be employed for preserving photographic prints or newspaper clippings, or it may be used by stamp collectors as a temporary or permanent mounting for stamps in sheet form, or for so-called "covers", which consist in complete mailing envelopes bearing postage stamps and post-marks secured in regular course of mail. It may be used simply as an album leaf for entertaining or educational matter, or it may be employed in preserving business data. And in certain arrangements the device is adapted for displaying some classes of merchandise, such as post cards, samples of fabrics or small objects which may be contained in envelopes.

The unit of the filing device is a transparent holder in the form of an envelope open at two opposite edges. As indicated in Figure 3, it may be constructed from a sheet of transparent material folded upon itself at 1, so as to form two leaves, 2 and 3, whose free edges, 4 and 5, lie adjacent each other. These free edges of the folder thus formed are permanently secured together, and as a preferred means for this purpose I employ a strip of material, preferably paper, creased longitudinally at 6, so that the portions, 7 and 8, adjacent the crease, may embrace the marginal portions of the transparent folder and form a closure for the open side of the folder. If desired, the portions, 7 and 8, may be attached to the transparent material by a suitable adhesive, but this is not always convenient as a manufacturing operation, and I find it quite as satisfactory to secure the parts by means of wire staples, as indicated at 9 on Figure 1.

Preferably, the securing strip, in addition to the parts, 7 and 8, includes wings, 10, which may be folded back over the parts, 7 and 8, so as to extend beyond the line of the crease, 6, in their normal position. These wings, 10, are then perforated, as shown at 11, and may engage the ring member, 12, of a ring binder, which is shown in section with its covers, 13, in Figure 4, and with several holder units thus secured therein. For this mode of use each of the holders becomes a transparent cover or envelope for such material as the user desires to preserve, such as post cards, photographs, cards or sheets containing information, such as price lists or specifications for commercial use, or even samples of textile fabric which will lie flat between the transparent leaves, 2 and 3, of the holders. As shown in Figure 1, a single holder constructed as just described, is shown containing a "cover", 14, of a philatelic collection.

Figure 5 shows an unusual type of binder in which this filing unit or holder my be employed. It consists of a back cover, 15, with upstanding posts, 16, which may be of the split rivet type, as shown, and which are spaced so as to engage the perforations, 11, of the wings, 10. The holder units are assembled in two piles, extending respectively in opposite directions from the posts, 16, with the wing portions, 10, interlapped, as shown in section in Figure 5. The cover member may consist of a middle section, 17, through which the end portions, 16", of the posts, 16, extend for securement, and from which flexible or hinged cover sections, 18, extend in opposite directions over the two groups of holder units respectively. This type of binder may serve the same purpose as that shown in Figure 4. Preferably, in making up the holder units as already described, the securing strip is coated with adhesive gum on its outer surface. When the wing portions, 10, 10, are folded back in the position shown in Figures 4 and 5, the gummed surfaces of each unit are disposed toward each other and need have no particular function. Figure 6, however, shows an arrangement of the units in which the wings, 10, are not folded back, but extend in the same direction from the pieces, 6, as the transparent folders themselves, and in this arrangement the gummed surfaces of the wing portions, 10, of adjacent units are secured together. If desired, this adhesive securement may extend farther along the strips toward their creased edges, 6. In any event, the adhesive attachment of the units forms them into a book-like assembly to which covers (not shown) may be added, if desired. In Figure 1 one of these wings, 10, is shown turned down against the front face of the folder, while the other wing is shown turned up, extending above the parts 7 and 8, indicating that the flaps may be utilized in either position, as hereinafter more fully described. In Figure 2 the securing strip is shown as viewed edgewise at the crease, 6, and with the flaps, 10, extending outwardly, that is, at right angles to the parts 7 and 8.

Figures 7 and 8 are fragmentary views of one corner of one of the transparent holder units in which a card or picture, 20, is carried. The corner of the transparent holder is cut off along a diagonal line, as seen at 21, thus leaving the extreme corner area of the card, 20, exposed. If the card is to be removed frequently, this exposed corner may be conveniently grasped for sliding the card out of the transparent holder. But if the card is to remain more or less permanently in the holder, it may be locked in position by applying to the exposed corner (and preferably to a similarly exposed corner at the other side of the holder) a pocket-like device, 22, which is similar to pocket corners intended for mounting cars and photographs, except that it need have no external gummed surfaces. As shown, the pocket has a triangular front wall, 22ª, which is of about the same area as the exposed corner portion of the card, 20. The rear wall, 22ᵇ, of the pocket is somewhat larger, so that it overlaps the diagonal edge, 21, of the transparent holder. One or both of the internal surfaces of the pocket, 22, are gummed so that if the exposed corner of the card, 20, is slightly moistened, it will be adhesively secured in the pocket when the latter is applied over it. The overlapping portions of the rear walls, 22ᵇ, of these pockets, 22, thus lock the card or picture, 20, against sliding movement in the transparent holder. To permit removal, the overlapping portion of the pocket wall, 22ᵇ, may be folded back past the diagonal edge, 21, of the holder.

Figures 10 and 11 illustrate arrangements of the holder units in which they are adhesively secured by their gummed strip portions to mounting surfaces, 23 and 24, which may be the leaves of an album or panel boards used for display purposes. In Figure 10 the holders are arranged directly over each other with only the lower margin of each one exposed, and the words "Index line" on the drawings are intended to designate any individual marking for the contents of each holder, which will assist in identifying it without viewing the entire face of the holder. Arrangements of this sort are of particular value for the display or filing of index cards, data sheets, price lists and the like. For purposes of illustration, both Figures 10 and 11 show the holders as containing envelopes or "covers" of a philatelic collection. Figure 11 shows an arrangement in which the holder units are staggered, so that two marginal portions of each unit are exposed beyond the adjacent margins of the next overlapping holder.

I claim:

1. A holder unit for the purpose indicated comprising a once-folded sheet of transparent material, and a securing member formed as a strip creased longitudinally and embracing the otherwise free edges opposite the fold of said sheet, and means permanently securing the median part of said strip to the said edges of said sheet, said strip including free marginal portions beyond the parts which are secured to the sheet, said marginal portions being available for attachment to a binder or other support.

2. A holder unit for the purpose indicated comprising a once-folded sheet of transparent material, and a securing member formed as a strip, creased longitudinally embracing the otherwise free edges opposite the fold of said sheet, the median part of said strip and the embraced portions of the sheet being punctured, and fastening means extending through the punctures for permanently securing the strip and sheet together.

3. A holder unit for the purpose indicated comprising a once-folded sheet of transparent material, and a securing member formed as a strip, creased longitudinally and embracing the otherwise free edges opposite the fold of said sheet, and means permanently securing the median part of said strip to the said edges of said sheet, said strip including free marginal portions beyond the parts which are secured to the sheet, said marginal portions being bent back over said secured portions to extend past the longitudinal crease for attachment to a support.

4. A filing device comprising a plurality of holder units as defined in claim 3, assembled with the extending portions of their securing strips interlapping and with the respective transparent folders extending in opposite directions from said interlapping parts, together with a back cover and a top cover, the latter having a middle portion which overlies the interlapped strips and a pair of hinged or flexible sections extending oppositely therefrom over the transparent units.

5. A filing device comprising a plurality of holder units as defined in claim 1, each having the outer surface of its securing strip gummed whereby said units are adhesively secured to each other, arranged as the leaves of a book.

6. A filing device comprising a plurality of holder units as defined in claim 1, each unit having an outer surface of its securing strip gummed, and a mounting member to which said units are adhesively attached by means of said gummed strips, said units being arranged overlapping each other so that a portion of the transparent folder of each unit is exposed beyond the margin of the next adjacent unit, and the units being arranged in staggered relation whereby a portion of each unit is exposed beyond two adjacent margins of the next overlapping unit.

7. A holder unit for the purpose indicated comprising a once-folded sheet of transparent material and a securing member formed as a strip, creased longitudinally and embracing the otherwise free edges opposite the fold of said sheet whereby the strip serves as a closure member uniting said free edges but leaving the holder open at the end, said folded sheet having a corner adjacent its fold cut off obliquely to expose for access the corner of a rectangular card or the like carried in the holder.

8. In the combination defined in claim 7, means for securing such card or the like in the holder comprising a pocket fitted over the exposed corner of the card and adhesively secured thereto with the margin of the pocket adjacent its open side overlapping the transparent material of the holder.

9. A holder unit for the purpose indicated comprising a once-folded sheet of transparent material and a securing member formed as a strip, creased longitudinally and embracing the otherwise free edges opposite the fold of said sheet, and means permanently securing the median part of said strip to the said edges of said sheet, the outer surfaces of said strip being gummed to serve for adhesively attaching the holder to a support, and portions of the strip being creased for bending back upon the portions which embrace the folder so as to extend beyond the longitudinal crease of the strip, the extending portions beyond said crease being perforated for the purpose indicated.

10. A holder unit for the purpose indicated comprising a once-folded sheet of transparent material and a securing member formed as a strip creased longitudinally and embracing the otherwise free edges opposite the fold of said sheet with means permanenly securing the median part of said strip to the said edges of said sheet, the strip including free marginal portions beyond the parts which are secured to the sheet, said marginal portions being bent back over said secured portions to extend past the longitudinal crease and having their outwardly exposed surfaces gummed for attachment to a support.

ALBERT W. ENGEL.